United States Patent
Sheets et al.

(10) Patent No.: US 10,433,128 B2
(45) Date of Patent: Oct. 1, 2019

(54) METHODS AND SYSTEMS FOR PROVISIONING MULTIPLE DEVICES

(71) Applicant: Visa International Service Association, San Francisco, CA (US)

(72) Inventors: John Sheets, San Francisco, CA (US); Glenn Powell, Fremont, CA (US); Igor Karpenko, Sunnyvale, CA (US); Erick Wong, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 482 days.

(21) Appl. No.: 14/591,836

(22) Filed: Jan. 7, 2015

(65) Prior Publication Data

US 2015/0195133 A1 Jul. 9, 2015

Related U.S. Application Data

(60) Provisional application No. 61/924,708, filed on Jan. 7, 2014.

(51) Int. Cl.
*H04W 4/50* (2018.01)

(52) U.S. Cl.
CPC ..................... *H04W 4/50* (2018.02)

(58) Field of Classification Search
CPC ..................................... H04W 4/001
USPC ........................................ 709/222
See application file for complete search history.

(56) References Cited

U.S. PATENT DOCUMENTS

| | | |
|---|---|---|
| 5,280,527 A | 1/1994 | Gullman |
| 5,613,012 A | 3/1997 | Hoffman et al. |
| 5,781,438 A | 7/1998 | Lee et al. |
| 5,883,810 A | 3/1999 | Franklin et al. |
| 5,930,767 A | 7/1999 | Reber |
| 5,953,710 A | 9/1999 | Fleming |
| 5,956,699 A | 9/1999 | Wong et al. |

(Continued)

FOREIGN PATENT DOCUMENTS

| | | |
|---|---|---|
| EP | 1028401 A2 | 8/2000 |
| EP | 2156397 A1 | 2/2010 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Krista M Zele
*Assistant Examiner* — Timothy Sowa
(74) *Attorney, Agent, or Firm* — Kilpatrick Townsend & Stockton LLP

(57) ABSTRACT

Embodiments of the present invention are directed to methods, systems, and apparatuses for provisioning account information to a mobile device. In one embodiment, following the provisioning of account information to a first mobile device of a user, a second mobile device of the user may be provisioned without requiring the user to provide account information for the provisioned accounts. In another embodiment, provisioned account information may be stored to a remote database, and subsequently restored to a previously provisioned mobile device or provisioned to a new mobile device.

21 Claims, 7 Drawing Sheets

(56) References Cited

U.S. PATENT DOCUMENTS

| | | |
|---|---|---|
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,974,622 B1 * | 7/2011 | McKinney ............. H04L 63/08 455/410 |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,090,409 B2 * | 1/2012 | Brown ................ H04M 1/7253 455/41.2 |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |

(56) References Cited

U.S. PATENT DOCUMENTS

| | | |
|---|---|---|
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,232 B2 * | 12/2013 | Siu .................. H04W 8/205 455/411 |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,706,588 B1 * | 4/2014 | Zhu .................. G06Q 20/32 705/35 |
| 8,751,391 B2 * | 6/2014 | Freund .................. G06Q 20/10 705/35 |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 8,930,274 B1 * | 1/2015 | Brickell ............... G06Q 20/385 705/44 |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 * | 3/2004 | Bishop .................. G06Q 20/04 235/380 |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0272016 A1 * | 11/2006 | Stewart .................. H04W 12/06 726/18 |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0208742 A1 * | 8/2008 | Arthur .................. G06Q 20/105 705/41 |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0210308 A1 * | 8/2009 | Toomer .................. G06Q 20/20 705/16 |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0159876 A1 * | 6/2010 | Brown .................. H04M 1/7253 455/410 |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |

(56) References Cited

U.S. PATENT DOCUMENTS

| | | |
|---|---|---|
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0311391 A1* | 12/2010 | Siu .................. H04W 8/205 455/411 |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0244920 A1* | 10/2011 | Coppinger .............. G06Q 20/20 455/558 |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1* | 3/2012 | Bauer .................. G06Q 20/20 705/16 |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0042316 A1* | 2/2013 | Lappetelainen ...... H04W 12/04 726/10 |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0142118 A1* | 6/2013 | Cherian .................. H04W 4/70 370/328 |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1* | 10/2013 | Khan .................. G06Q 20/40 705/64 |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |

(56) References Cited

U.S. PATENT DOCUMENTS

| | | |
|---|---|---|
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0051418 A1* | 2/2014 | van Os ............... H04W 4/001 455/418 |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0092781 A1* | 4/2014 | Tan ..................... H04W 4/16 370/259 |
| 2014/0101035 A1* | 4/2014 | Tanner ............... G06Q 20/3278 705/39 |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0310183 A1 | 10/2014 | Weber |
| 2014/0310350 A1* | 10/2014 | Borggaard ........... H04W 4/008 709/204 |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0351118 A1* | 11/2014 | Zhao ................... G06Q 20/227 705/40 |
| 2014/0372308 A1 | 12/2014 | Sheets |
| 2015/0019443 A1 | 1/2015 | Sheets et al. |
| 2015/0020185 A1* | 1/2015 | McDonough ........ H04L 67/02 726/9 |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0058191 A1* | 2/2015 | Khan ................... G06Q 20/42 705/35 |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0113109 A1* | 4/2015 | Sanjeev ............... H04L 41/5051 709/223 |
| 2015/0120472 A1 | 4/2015 | Aabye et al. |
| 2015/0120556 A1* | 4/2015 | Brickell ............... G06Q 20/385 705/44 |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0156601 A1* | 6/2015 | Donnellan ........... H04W 4/008 455/41.1 |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0197725 A1 | 7/2016 | Hammad |
| 2016/0269391 A1 | 9/2016 | Gaddam et al. |
| 2016/0308995 A1 | 10/2016 | Youdale et al. |
| 2017/0109745 A1 | 4/2017 | Al-Bedaiwi |
| 2017/0186001 A1 | 6/2017 | Reed et al. |
| 2017/0201520 A1 | 7/2017 | Chandoor |
| 2017/0295155 A1 | 10/2017 | Wong et al. |
| 2017/0364903 A1 | 12/2017 | Lopez |
| 2018/0075081 A1 | 3/2018 | Chipman |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

(56) References Cited

OTHER PUBLICATIONS

Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request via Access Device filed Nov. 25, 2015.
Prakash et al., U.S. Appl. No. 14/955,716 (unpublished), Provisioning Platform for Machine-to-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Kaja, et al., U.S. Appl. No. 15/585,077 (Unpublished), System and Method Using Interaction Token, filed May 2, 2017.
Hammad, U.S. Appl. No. 15/977,921 (Unpublished), Integration of Verification Tokens with Mobile Communication Devices, filed May 11, 2018.
Raj, et al. U.S. Appl. No. 15/956,991 (Unpublished), Mobile Tokenization Hub, filed Apr. 19, 2018.

* cited by examiner

METHODS AND SYSTEMS FOR PROVISIONING MULTIPLE DEVICES

CROSS-REFERENCE TO RELATED APPLICATIONS

This application claims the benefit of priority U.S. Provisional Application No. 61/924,708, filed Jan. 7, 2014, titled "METHODS AND SYSTEMS FOR PROVISIONING MULTIPLE DEVICES," which is incorporated by reference in its entirety for all purposes.

BACKGROUND

The uses and capabilities of user devices (e.g., mobile devices) have rapidly increased in recent years, such as the ability to make payments. In effect, users are increasingly conducting transactions using such devices (e.g., smart phones and other portable devices), rather than with physical forms of tender (e.g., banknotes) with set monetary values.

Many users have multiple devices (phone, tablet, etc.) that they may use in different environments, contexts, etc. Accordingly, there is a need to allow for easy and efficient provisioning of account data onto multiple devices associated with a user. In current solutions, when a user has multiple devices that require provisioning, the user typically is required to enter the account information for each account to be provisioned on each device. Thus, completing the provisioning process on each device individually can be onerous, as the user must enter account information on each and every device that the user owns.

Embodiments of the present invention address the above problems and other problems, individually and collectively.

BRIEF SUMMARY

Embodiments of the present invention relate to systems and methods for the efficient provisioning of account information to a mobile device. Embodiments utilize previous provisioning processes to streamline subsequent provisioning processes. For example, a user may have previously initiated a provisioning process to provision account information to a first device associated with the user. When the user wants to provision a second device associated with the user with the account information, the wallet provider and a provisioning system may use the provisioned account information for the first device to provision the second device. This can be accomplished without requiring the user to input all the account information for the previously provisioned accounts onto the second device, and in some cases, without sending a request to an issuer for approval of the provisioning request for the second device.

Some embodiments of the present invention are also directed to storing provisioned account information in a provisioning record in a database. Once stored in the database, the system allows the user to re-provision previously provisioned account information to the same device (e.g., back-up/restore provisioned account information) or using the previously provisioned account information to provision a new device (e.g., clone or "move" account information to the new device).

One embodiment of the invention is directed to a method for provisioning account information that was previously provisioned on a first device to a second device. The method comprises receiving, by a server computer, a provisioning request from the first device or the second device. The provisioning request may comprise interaction data indicative of a local interaction between the first device and the second device. The method further comprises determining that provisioning the second device with the account information is permitted based upon the interaction data. The method further comprises initiating provisioning of the second device with the account information associated with the first device.

Another embodiment of invention is directed to a method for provisioning account information that was previously provisioned on a first device to a second device. The method comprises the second device sending a provisioning request to a server computer. The provisioning request may include interaction data indicative of a local interaction between the first device and the second device. The method further comprises receiving, by the second device, provisioning data associated with the account information that was previously provisioned to the first device. The method further comprises storing the provisioning data on the second device.

Another embodiment of the invention is directed to a method comprising receiving, by a server computer, a provisioning request from a requesting device to provision an account onto the requesting device. The provisioning request may include a passcode and a device identifier associated with the requesting device. The method further comprises retrieving a provisioning record associated with the account from a database using the passcode. The provisioning record may include a device identifier associated with a prior device that was previously provisioned with first provisioning data associated with the account. The method further comprises comparing the device identifier associated with the requesting device to the device identifier associated with the prior device to determine if the requesting device is the prior device. When the requesting device is determined to be the prior device, the method further comprise initiating provisioning of the first provisioning data to the requesting device. When the requesting device is determined to be a different device than the prior device, the method further comprises initiating provisioning of second provisioning data associated with the account to the requesting device.

These and other embodiments of the invention are described in further detail below with reference to the Drawings and the Detailed Description.

DETAILED DESCRIPTION

Figure 1:
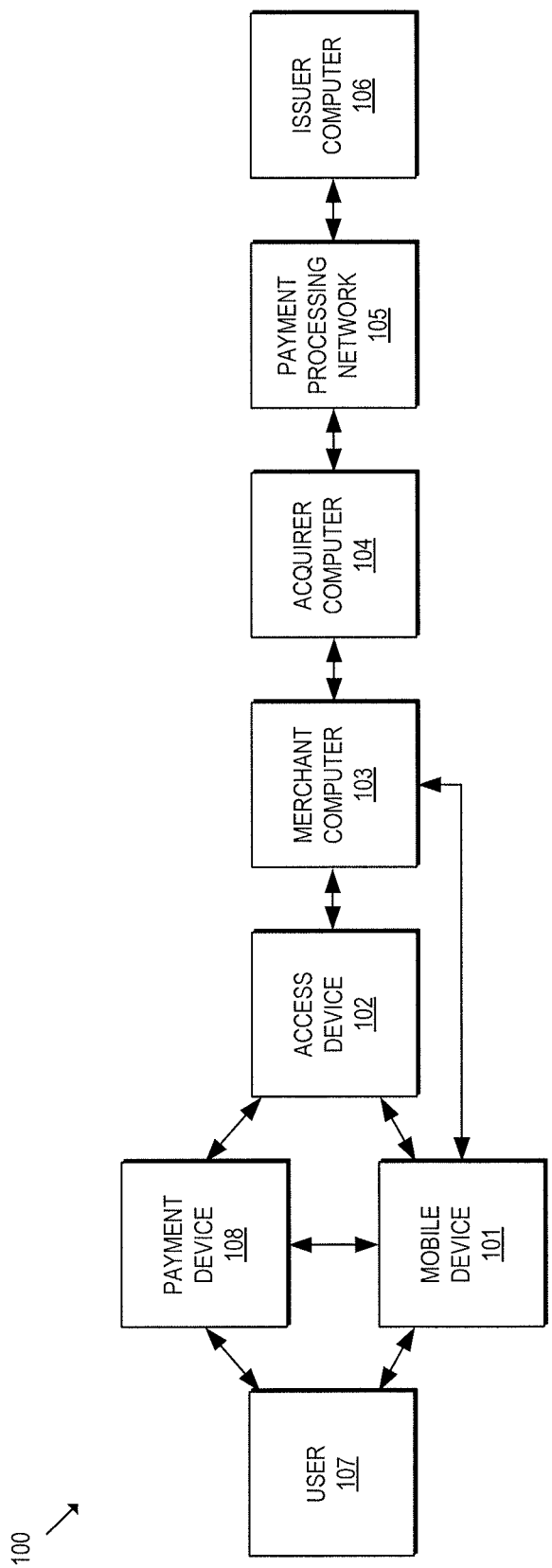
FIG. 1 depicts a transaction processing system according to an embodiment of the present invention.

Prior to discussing embodiments of the invention, descriptions of some terms may be helpful in providing a better understanding of the invention.

A "device" may be an apparatus that includes one or more electronic components which can be used to communicate with another device or system. It may include any electronic and/or communication device that may be transported and operated by a user, which may also provide remote communication capabilities with resources via one or more networks. In some embodiments, a device can be hand-held and compact so that it can fit into a user's wallet and/or pocket (e.g., pocket-sized). The device can include a processor, and memory, input devices, and output devices, operatively coupled to the processor. Examples of devices include mobile devices, such as mobile phones (e.g., cellular phones), personal digital assistants (PDAs), tablet computers, laptop computers (e.g., netbooks), personal music players, hand-held electronic reading devices, wearable computing devices, etc., as well as other computing devices such as computers.

"Interaction data" may refer to data indicative of an interaction. In some embodiments, the interaction data may indicate that an interaction occurred between two or more entities that are nearby or co-located with each other. The two or more entities may be computers or devices, such as mobile devices. In some embodiments, the interaction data may indicate a direct interaction between two or more devices that are communicatively connected with each other. For example, interaction data may include data that is provided to a first device by a second device or vice versa (e.g., through a wired or wireless connection between the two or more devices). In some embodiments, the interaction data may indicate an indirect interaction between two or more devices operated by a user. For example, the interaction data may include data that is presented on a first device viewed by a user, and inputted on a second device by the user. In some embodiments, interaction data may include a validation code (which may also be referred to as a passcode), and may be used to verify that an interaction occurred between the two devices. Interaction data may also include an interaction type indicator indicating the type of interaction (e.g., wired or wireless) being conducted between two or more devices. Interaction data may also include length of interaction, time of day of the interaction, etc.

"Local interaction" may refer to a type of interaction between two nearby or co-located entities within a geographical location. In some embodiments, a local interaction between two or more devices may occur via a local connection between the two or more devices being connected to the same local area network connection (e.g., Wi-Fi) or the same personal area network connection (e.g., Bluetooth™). . In other embodiments, the local interaction may occur via a local connection between two or more devices that are connected via a physical link (e.g., using a wired connection such as a cable) between the two or more devices.

The term "message" may refer to any data or information that may be transmitted from one component to another. A message may be communicated internally between devices/components within a computer or computing system or externally between devices over a communications network (e.g., from one server computer or computing device to another server computer or computing device). In some embodiments, a message may include encrypted or anonymized information.

The term "account information" may refer to any information that may be associated with an account. For example, account information may include an account identifier associated with a payment account (e.g., a credit card number or debit card number), or a token that is a substitute for an account identifier. The account information may also include user information for the user associated with the account. The account information for a payment account may be generated by an issuer associated with the payment account. In some embodiments, the account information may be stored in a memory component of a device (e.g., mobile device) for identifying the payment account during a transaction.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Provisioning" may include a process of enabling a device to use a resource or service. In some embodiments, provisioning may involve enabling a device to perform transactions using an account. In some embodiments of the present invention, provisioning can include adding provisioning data associated with account information (e.g., a token representing the account information) to a device.

A "provisioning request" may be a request sent to request provisioning of a device. The provisioning request may be a request message to provision information (e.g., account information) to a mobile device. A provisioning request may include interaction data and device identifiers for initiating a provisioning process.

"Provisioning data" may include data that is generated as part of a provisioning process. In some embodiments, provisioning data may include account information that is sent to and stored on a device in response to a provisioning request. In some embodiments, provisioning data may include a token that is a substitute for a real account identifier.

A "provisioning record" may be a record containing information regarding a provisioning process. The provisioning record may include account information, user data, and device information (e.g., a device identifier such as a secure element identifier or computing device identifier) about a device that is provisioned with the account information.

A "validation code" may include a unique identifier that may be used for establishing the authenticity of a user, an account and/or device. Examples of a validation code may include a password, a PIN, etc. The validation code may be alphanumeric, or composed of only numbers or only letters. Validation codes are not limited to strings of characters, and may include barcodes, QR codes, and graphics. The validation code may also be referred to as a "passcode."

The term "device identifier" may refer to any information that may be used to identify a device or a component of the device. For example, a device identifier may refer to data regarding a device, and may include a hardware identifier, an IP address, a MAC address, mobile device identifier, SIM card number, etc. In some embodiments, the device identifier may be a secure element identifier. In some embodiments, a device identifier may include other information about a device such as browser data, operating system data, mobile application data, GPS location, device type (e.g., data indicating that the device is a phone or card, or is made by a particular manufacturer), A "secure element" may refer to a secure memory component of a mobile device. In some embodiments, provisioned account information and other sensitive data (e.g., user data, payment data) may be stored in the secure element. The secure element may be configured such that the data stored in the secure element may not be directly accessible by outside applications and a mobile wallet application associated with the secure element may be accessed to obtain the provisioned account information stored or provisioned on the secure element. In some embodiments, a merchant application, a remote transaction application, or other application or applet may interface with a mobile wallet application in order to gain access to the account information stored on the secure element.

The term "secure element identifier" may refer to any information that may be used to identify a secure element. The secure element identifier may be a unique identifier identifying a secure hardware element stored on a device. The secure element identifier may further be used to indicate the location on the device for storage of the provisioned account information.

The term "initiating" may include the first steps taken in order to begin a process or the steps conducted in order to complete a process. For example, "initiating, provisioning of the second device with the account information associated with the first device" can refer to the actual process required to complete the action relating to the provisioning of account information to the second device. In some embodiments, "initiating provisioning of the second device with the account information associated with the first device" can also refer to the process of sending a message, such as a provisioning instruction message, from a server computer to the payment processing network with instructions for performing the process required to complete the action relating to the provisioning of account information to the second device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests received from one or more client computers. The server computer may comprise one or more computational apparatuses and may use any of a variety of computing structures, arrangements, and compilations for servicing the requests from one or more client computers.

A "database" may include any hardware, software, firmware, or combination of the preceding for storing and facilitating the retrieval of information. In addition, the database may use any of a variety of data structures, arrangements, and compilations to store and facilitate the retrieval of information.

I. Exemplary Payment Transaction System

FIG. 1 shows a transaction processing system 100 according to an embodiment of the present invention. The system 100 may be used to facilitate data communications between the various computers depicted in FIG. 1 for authentication and/or authorizing financial and non-financial transactions. The system 100 may include a user 107, a payment device 108, a mobile device 101, an access device 102, a merchant computer 103, an acquirer computer 104, a payment processing network 105, and an issuer computer 106. Each of these systems and computers may be in operative communication with each other. The user 107 may use the mobile device 101 to conduct a financial transaction (e.g., a payment transaction) with the access device 102 that may be communicatively coupled to the merchant computer 103. The user 107 may also use the payment device 108 to conduct the financial transaction. The merchant computer 103 may be connected to the acquirer computer 104 to pass transaction related messages to the issuer computer 106 via the payment processing network 105.

For simplicity of illustration, a certain number of components are shown is shown in FIG. 1. It is understood, however, that some embodiments of the invention may include fewer than or greater than all of the components shown in FIG. 1. In addition, embodiments of the invention may include more than one of each component shown in FIG. 1. The components in FIG. 1 may communicate via any suitable communication medium (including the Internet), using any suitable communications protocol.

The mobile device 101 may be in any suitable form. For example, suitable user mobile devices 101 may be hand-held and compact so that they can fit into a user's pocket. Examples of mobile devices 101 may include any device capable of accessing the Internet. Specific examples of mobile devices 101 include cellular or wireless phones (e.g., smartphones), tablet phones, tablet computers, laptop computers, desktop computers, personal digital assistants (PDAs), pagers, portable computers, smart cards, and the like. The mobile device 101 may be operated by the user 107.

The mobile device 101 may include a processor, memory, input/output devices, and a computer readable medium coupled to the processor. The computer readable medium may comprise code, executable by the processor for performing the functionality described below. In some embodiments, the mobile device 101 may include a browser and/or applications (e.g., mobile applications, computer programs) stored in the memory and configured to retrieve, present, and send data across a communications network (e.g., the Internet).

The access device 102 may be a device associated with a merchant. The access device 102 may include a processor and a computer readable medium coupled to the processor, the computer readable medium comprising code, executable by the processor for performing the functionality described below. Example access devices 102 may include point of sale (POS) terminals, near-field communications (NFC) devices, magnetic stripe readers, and the like.

The merchant computer 103 may be comprised of various modules that may be embodied by computer code, residing on computer readable media. The merchant computer 103 may include a processor and a computer readable medium coupled to the processor, the computer readable medium comprising code, executable by the processor for performing the functionality described below. The merchant computer 103 may be in any suitable form. Examples of the merchant computer 103 may include a web server computer hosting a merchant Internet website. Additional examples of merchant computers include any device capable of accessing the Internet, such as a personal computer, cellular or wireless phones, personal digital assistants (PDAs), tablet computers, and handheld specialized readers.

The acquirer computer 104 is typically a system associated with an entity (e.g., a bank) that has a business relationship with a particular merchant or other entity. The acquirer computer 104 may include a processor and a computer readable medium coupled to the processor, the computer readable medium comprising code, executable by the processor for performing the functionality described below. The acquirer computer 104 may be configured to route transaction authorization messages between the merchant computer 103 and the payment processing server computer 104.

The payment processing network 105 may comprise a server computer comprising a processor and computer readable medium coupled to the processor, the computer readable medium comprising code, executable by the processor for performing the functionality described below. In some embodiments, the server computer may be coupled to a database and may include any hardware, software, other logic, or combination of the preceding for servicing the requests from one or more client computers.

The payment processing network 105 may include data processing subsystems, networks, and operations used to support and deliver authorization services, exception file services, and clearing and settlement services. An exemplary payment processing network 105 may include VisaNet™. Networks that include VisaNet™ are able to process credit card transactions, debit card transactions, and other types of commercial transactions. VisaNet™, in particular, includes an integrated payments system that processes authorization requests and a Base II system that performs clearing and settlement services. The payment processing network 105 may use any suitable wired or wireless network, including the Internet.

An issuer computer 106 is typically associated with a business entity (e.g., a bank). The issuer computer 106 may include a processor and a computer readable medium coupled to the processor, the computer readable medium comprising code, executable by the processor for performing the functionality described below. The issuer computer 106 may maintain financial accounts for the user 107, and can issue payment devices 108, such as a credit or debit card to the user 107.

The payment device 108 may refer to any device that may be used to conduct a financial transaction, such as to provide payment information to a merchant. The payment device 108 may be in any suitable form. For example, suitable payment devices 108 include, but are not limited to, smart cards, magnetic stripe cards, keychain devices, cellular phones, personal digital assistants (PDAs), pagers, payment cards, security cards, access cards, smart media, transponders, 2-D barcodes, an electronic or digital wallet, and the like. Such devices can operate in either a contact or contactless mode. In some configurations, the payment device 108 directly interacts with the access device 102 (e.g., without the use of any other device and/or communication network), but in some configurations, the payment device 108 communicates with the access device 102 using an intermediary device and/or a communication network.

II. Provisioning Account Information to Multiple Mobile Devices

A. System

Figure 2:
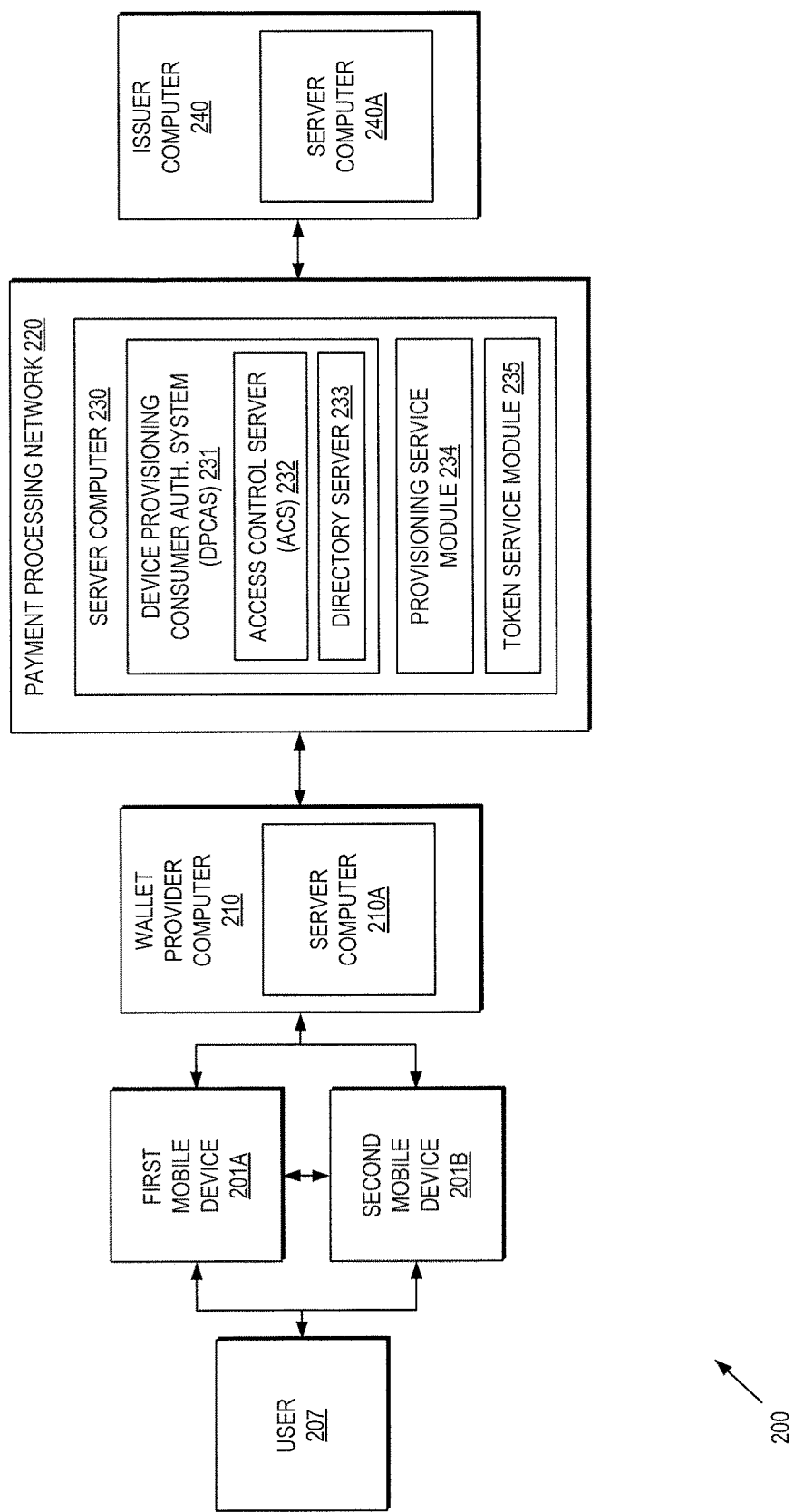
FIG. 2 depicts a block diagram of an account provisioning system according to an embodiment of the present invention.

FIG. 2 depicts a block diagram of an account provisioning system 200 according to an embodiment of the present invention. System 200 in FIG. 2 comprises a user 207, a first mobile device 201A (e.g., a mobile phone), a second mobile device 201B (e.g., a tablet or another mobile phone), a wallet provider computer 210, a payment processing network 220, and an issuer computer 240. Each of these systems and computers may be in operative communication with each other.

For simplicity of illustration, a certain number of components are shown is shown in FIG. 2. It is understood, however, that some embodiments of the invention may include fewer than or greater than all of the components shown in FIG. 2. In addition, embodiments of the invention may include more than one of each component shown in FIG. 2. The components in FIG. 2 may communicate via any suitable communication medium (including the Internet), using any suitable communications protocol.

In FIG. 2, each of mobile devices 201A and 201B may include a mobile wallet or payment application that can be provisioned with account information to enable each mobile device to conduct transactions. The wallet provider computer 210 may comprise a server computer 210A to facilitate the provisioning process. The server computer 210A may include a processor and a computer readable medium coupled to the processor, the computer readable medium comprising code, executable by the processor.

The wallet provider computer 210 may be operated or associated with an application provider. The application provider may be an entity that provides an application to a mobile device for use by a user. In some embodiments, the application provider can be a wallet provider that provides a mobile wallet or payment application to a mobile device. The wallet provider computer 210 may maintain one or more digital wallets for each user, and each digital wallet may be associated with payment data for one or more payment accounts. Examples of digital wallets may include Visa Checkout™ or Google™ Wallet, etc. The server computer 210A may send and receive over-the-air (OTA) messages to a mobile wallet application 303A stored on the mobile device 301. The wallet provider server computer 210A may include a processor and a computer readable medium coupled to the processor, the computer readable medium comprising code, executable by the processor for performing the functionality described in further details below.

The payment processing network 220 may comprise a server computer 230. The server computer 230 may include a processor and a computer readable medium coupled to the processor, the computer readable medium comprising code, executable by the processor.

The payment processing network 220 may be associated with one or more payment service providers. The payment processing network 220 may include any entity that provides provisioning or personalization services. For example, the payment processing network 220 may maintain a personalization database with user information, and may be configured to communicate with one or more issuer computers 240 to determine personalized payment data for user 207. The payment processing network 220, via a provisioning service module 234, may provide provisioning services to the wallet provider computer 210, in which the wallet provider computer 210 may utilize an application programming interface (API) to communicate with the payment processing network server computer 230.

The payment processing network server computer 230 may include a provisioning service module 234 and/or a device provisioning consumer authentication system (DP-CAS) 231. The DPCAS 231 may operate as an authentication server that provides authentication services, and may include an access control server 232 (e.g., to determine whether an account is eligible for or participates in particular services) and/or a directory server 233 (e.g., that identifies, for an account, the associated issuer). In some embodiments, the DPCAS 231 may verify authentication information associated with the user 207, such as user-identifying information, one-time passwords, challenge-response information, etc. In other embodiments, parts or all of functionalities of DPCAS 231 may be incorporated with the issuer computer 240 or another entity. For example, in some embodiments, the functionalities of the ACS 232 may be provided by the issuer computer 240. In some embodiments, the DPCAS 231 may be configured to determine an appropriate authentication system to use for authentication, which may be implemented by the payment processing network server computer 130, the issuer computer 240, wallet provider computer 210, or another entity.

The directory server 233 may provide a service that is used for message routing and/or data computation. In some embodiments, the directory server 233 is capable of receiving messages (e.g., provisioning request messages, service provider request messages, verify enrollment request messages, other transaction-related messages), determine the appropriate destination for the received messages, and route the received messages to the appropriate destination. For example, the directory server 233 may receive the provisioning request message, determine the appropriate issuer of an account associated with the provisioning request message, and then route the provisioning request message to the appropriate issuer computer 240. In some embodiments, the directory server 233 may include or be associated with a database containing routing tables that may be used to determine the appropriate issuer computer 240 to route the provisioning request message. The access control server 232 may provide authentication and verification services. In some embodiments, the access control server 232 may be managed by the issuer computer 240.

In some embodiments, the payment processing network 230 may provide additional services, including but not limited to a token service module 235 that can generate and/or provide a "token" that is associated with sensitive data (e.g., account information). For example, the token service module 235 may generate a token that can be used as a substitute for a real account identifier (e.g., a Primary Account Number (PAN) of an account. The token server module 235 may also maintain a stored association (or mapping) between the token and the PAN, such that the token service module 235 may be able to "translate" the token back to the original PAN. The use of a token instead of a real account identifier during a transaction can provide enhanced security.

The issuer computer 240 may comprise a server computer 240A. The server computer 240A may include a processor and a computer readable medium coupled to the processor, the computer readable medium comprising code, executable by the processor. In some embodiments, the issuer computer 240 may communicate with the payment processing network 220 to provide authentication processes and account information associated with an account of the user 207.

Figure 3:
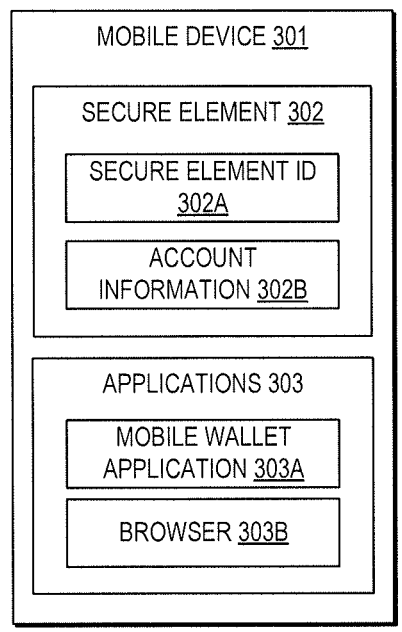
FIG. 3 depicts a block diagram of an exemplary mobile device according to an embodiment of the present invention.

FIG. 3 depicts a block diagram of an exemplary mobile device 301 according to an embodiment of the present invention. FIG. 3 shows a number of components, and the mobile devices 301 according to embodiments of the present invention may comprise any suitable combination or subset of such components. The first mobile device 301A and the second mobile device 301B depicted in FIG. 2 may include some or all of the components of the mobile device 301 shown in FIG. 3. The mobile device 301 may comprise a secure element 302 and applications 303.

The secure element 302 may be a storage location on the mobile device 301 to store sensitive data (e.g., secure applications and credentials). The secure element 302 may be a secure memory on the mobile device 301 such that the data contained on the secure element 302a cannot easily be hacked, cracked, or obtained by an unauthorized entity. In some embodiments, the secure element 302 may include a secure element identifier 302A and provisioned account information 302B stored on the secure element 302. The secure element identifier 302A may be a unique identifier for the secure element of the mobile device 301. The provisioned account information 302B may include sensitive data associated with an account (e.g., a financial account), including an account identifier and/or a token.

The secure element 302 may store information including financial information, bank account information, credit, debit, or prepaid account information (or payment tokens associated with such credit, debit, or prepaid account information), account balance information, expiration dates, verification values such as CVVs or dCVVs, etc. Other information that may be stored in the secure element 302 may include consumer information such as name, date of birth, etc. In other embodiments, some or all of the foregoing information may be stored at a remote server computer (e.g., in the cloud).

In some embodiments, the secure element 302 may be either embedded in the handset of the mobile device 301 or in a subscriber identity module (SIM) card that may be removable from the mobile device 301. The 301A can also be included in an add-on device such as a micro-Secure Digital (micro-SD) card or other portable storage device.

It should be noted that although mobile device 301 has been described as including a secure element, in some embodiments, a mobile device may not have a secure element, and the information described above can be stored in a memory of the mobile device 301 that is not part of a secure element.

The applications 303 included in the mobile device 301 may be stored in a memory element (not shown). The memory element may be present within a body of the mobile device 301 or may be detachable from it. The applications 303 may be computer code or other data that may be executable by a processor to perform operations. The applications 303 stored in the memory element may include a mobile wallet application 303A or a payment application, and may include a browser application 303B. The applications 303 may operate on the mobile device 301 to provide a user interface for user interaction (e.g., to enter and view information).

B. Methods

Methods according to embodiments of the invention can be described with respect to FIGS. 2-6.

Figure 4:
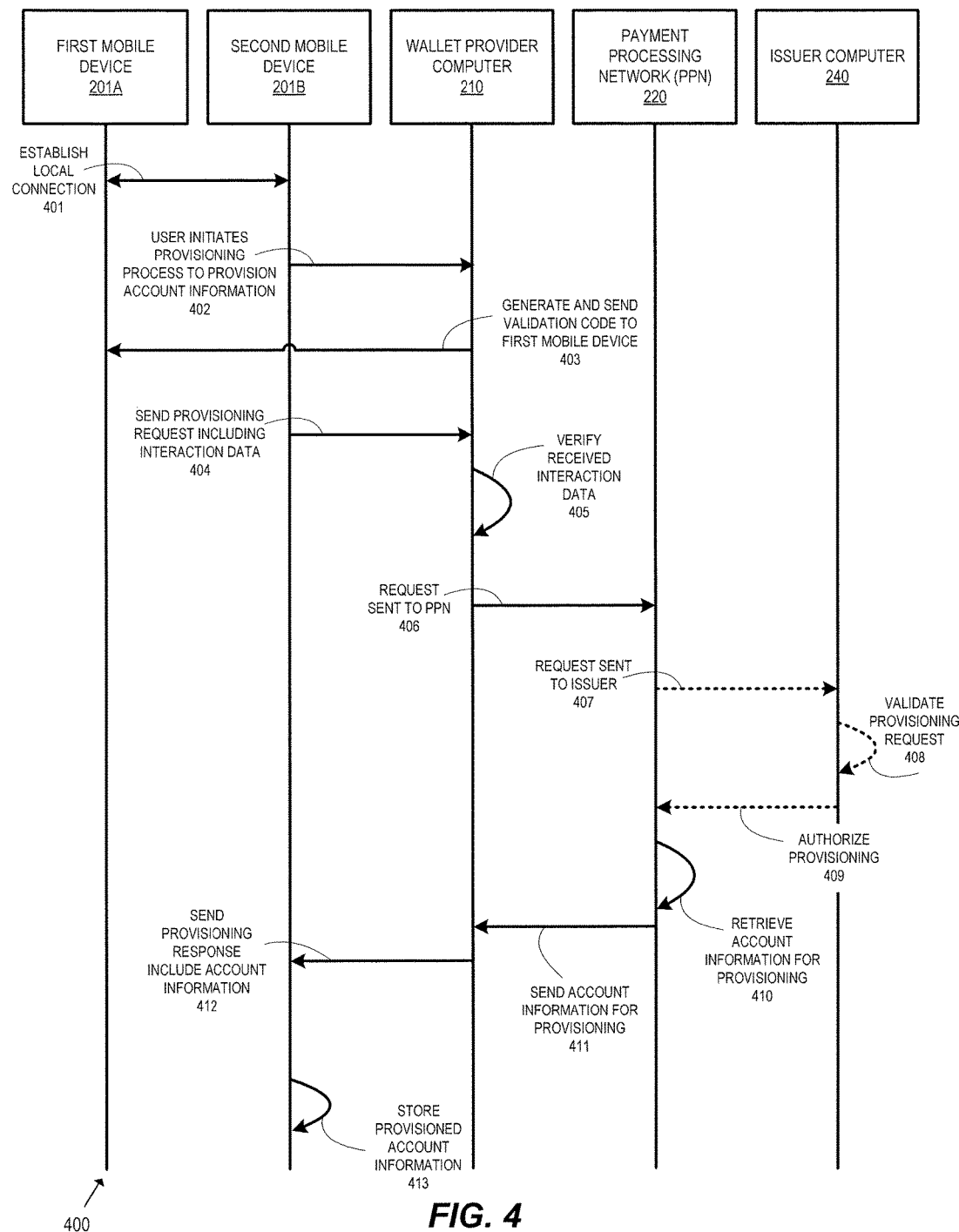
FIG. 4 depicts a flow diagram depicting account provisioning in an account provisioning system according to an embodiment of the present invention.

FIG. 4 depicts a flow diagram 400 depicting account provisioning in an account provisioning system according to an embodiment of the present invention.

Prior to initiating a provisioning process to provision the account information to the second mobile device 201B, the first mobile device 201A associated with the user 207 may have performed a provisioning process to provision account information onto the first mobile device 201A.

In step 401, a local connection is established between a first mobile device 201A associated with a user 207 and a second mobile device 201B associated with the user 207. The local connection may be established via personal area network (e.g., Bluetooth™) connection or via a local area network (e.g., Wi-Fi) connection. In some embodiments, the local connection may be established by the user 207 accessing a mobile wallet application 303A on one or both of the first mobile device 201A and the second mobile device 201B. In such embodiments, the user 207 may select a mobile device 201 to connect to from a list of mobile devices and be prompted to initiate the local connection.

In some embodiments, the second mobile device 201B may request and receive a first device identifier associated with the first mobile device 201A via the local connection. In other embodiments, the first mobile device 201A may send the first device identifier associated with the first mobile device 201A to the second mobile device 210B without a request from the second mobile device 201B.

In step 402, a user 207 sends a message to a wallet provider computer 210 via the second mobile device 201B to initiate a process to provision account information to the second mobile device 201B. In some embodiments, the user 207 may be presented with a set of options and services provided by the mobile wallet application 303A and the user 207 may initiate the process to provision by selecting an option from the set of options. For example, the user 207 may select one or more accounts to provision to the second mobile device 201B from a list of account, and/or select the first mobile device 201A from the list of mobile devices.

In some embodiments, the user 207 may initiate the process of provisioning account information to the second mobile device 201B by accessing a mobile wallet application 303A stored on the user's second mobile device 201B. The mobile wallet application 303A may be computer code or other data stored on a computer readable medium (e.g. memory element or secure element) that may be executable by a processor to complete a task. The wallet application may provide a user interface to allow a user to initiate a provisioning process. In response to a user command to initiate the provisioning process, the mobile wallet application 303A may communicate with a wallet provider computer 220 to retrieve and return information during the provisioning process. For example, the mobile wallet application 303A can communicate with the wallet provider computer 220 to send and receive over-the-air (OTA) messages to provision the second mobile device 201B.

In step 403, in response to the message to initiate the process to provision account information to the second mobile device 201B, the wallet provider computer 210 may generate and send a validation code to the first mobile device 201A. The validation code may be a unique identifier to establish the authenticity of the user attempting to provision account information to the second mobile device 201B. In some embodiments, the validation code may be alphanumeric, or composed of only numbers or only letters. The validation code may be a unique one-time value or a static value previously assigned to the user 207.

In some embodiments, the validation code may be sent to the mobile wallet application 303A of the first mobile device 201A and presented on a display of the first mobile device 201A. In other embodiments, the validation code may be sent to the first mobile device 201A via other appropriate messaging means, including email, SMS messaging, or by a voice message. Upon receiving the validation code on the first mobile device 201A, a user may view the validation code, and enter it on the user interface of the second mobile device 201B to establish an interaction between the first mobile device 201A and the second mobile device 201B. in some embodiments, the validation code can be transmitted from the first mobile device 201A to the second mobile device 201B using the local connection established in step 401.

In step 404, a provisioning request including interaction data is sent by the second mobile device 201B to the wallet provider computer 210. In some embodiments of the present invention, the interaction data may include the validation code previously sent to the first mobile device 201A and entered or otherwise provided to the second mobile device 201B. The interaction data may also include additional data indicative of the local interaction between the first mobile device 201A and the second mobile device 201B such as a device identifier of the first mobile device 201B that was provided to the second mobile device 201B via the local connection. In some embodiments, the first device identifier may be a secure element identifier of the first mobile device 201A, to identify the secure element storing the account information on the first mobile device 201A. In some embodiments, the interaction data may also include information on the local area network or personal area network to which the first mobile device 201A and the second mobile device 201B are connected. In some embodiments, the account information provisioned on the first mobile device 201A may be determined by the wallet provider computer 210 based on the interaction data.

In some embodiments, the provisioning request may also include a second device identifier associated with the second mobile device 201B. The provisioning request may also include a selection of one or more accounts associated with the user 207 for provisioning to the second mobile device 201B. In some embodiments, the second mobile device 201B may be provisioned with greater than, less than, or all accounts previously provisioned to the first mobile device 201A.

In step 405, the wallet provider computer 210 receives the provisioning request from the second mobile device 201B comprising the interaction data. The wallet provider computer 210 may then determine that provisioning the second mobile device 201B with the account information is permitted based upon the interaction data received in the provisioning request. In some embodiments, the wallet provider computer 210 may determine whether the validation code previously generated by the wallet provider computer 210 matches the validation code received in the provisioning request received from the second mobile device 201B.

In some embodiments, when the generated validation code matches the received validation code, the second mobile device 201B may be verified as having interacted and being co-located with the first mobile device 201A, and thus may be eligible for the provisioning of the account information. Co-location may also be determined by data sent to the wallet provider computer 210 from the first mobile device 201A and the second mobile device 201B indicating that the first mobile device 201A and the second mobile device 201B are connected to the same local area network connection (e.g., Wi-Fi) or personal area network connection (e.g., Bluetooth™, near-field communications). For example, a network identifier may be sent to indicate the type of local connection that was performed between the first mobile device 201A and the second mobile device 201B.

In step 406, after the wallet provider computer 210 has verified that provisioning of the second mobile device 201B is permitted, the provisioning request is forwarded to the payment processing network 220. In some embodiments of the present invention, when the processing network 220 receives the provisioning request, the provisioning request may be sent to the issuer computer 240 for validation and approval of the provisioning request. For example, the user may want to provision an account to the second mobile device 201B that was not previously provisioned to the first mobile device 201A. In such embodiments, the process proceeds to step 407 below. In other embodiments, as the account information was previously provisioned to the first mobile device 201A through a provisioning process approved by the issuer computer 240, the issuer computer 240 may not require a new validation and approval to provision the account information to the second mobile device 201B. In such embodiments, the process proceeds to step 410 below.

In step 407, the provisioning request is sent to the issuer computer 240 by the payment processing network 220. In some embodiments, a directory server 233 may be accessed for routing of the provisioning request to the appropriate issuer computer(s) 240 associated with the accounts to be provisioned to the second mobile device 201B.

In step 408, the issuer computer 240 may validate the provisioning request. The issuer computer 240 may perform a risk analysis as part of the process of validating the provisioning request. In such embodiments, the issuer computer 240 may use the history of past provisioning associated with the user and/or the first mobile device 201A and the second mobile device 201B, among other data, to determine whether the provisioning request should be approved or denied. In some embodiments, the issuer computer 240 may also perform an authentication process to verify that the user 207 making the provisioning request is associated with the account to be provisioned. In such embodiments, the issuer computer 240 may retrieve user information and mobile device information from the provisioning request to perform the authentication process.

In some embodiments, the provisioning request sent to the issuer computer 240 may comprise additional data fields. For example, the provisioning request sent to the issuer computer 240 may include data indicating the number of mobile devices previously provisioned with the account, the number of mobile devices provisioned by the user, and a threshold for maximum provisioning processes and/or provisioned mobile devices. In such embodiments, this data may be used by the issuer computer 240 to perform a risk analysis.

In step 409, when the issuer computer 240 for the account has validated the provisioning request from the second mobile device 201B, the issuer computer 240 may authorize the provisioning of the account information for the account to the second mobile device 201B. The issuer computer 240 may generate and send a notification message to the payment processing network 220 indicating the result of the validation. In some embodiments, where the provisioning request was not validated, the notification message may indicate that the provisioning request should be denied.

In step 410, the payment processing network 220 may retrieve account information associated with the accounts to be provisioned to the second mobile device 201B. The payment processing network 220 may tokenize the account information using a token service module 235 in order to protect the real account identifier from being sent and potentially accessed by individuals other than the user 207. In some embodiments, a provisioning record associated with the first mobile device 201A may be accessed by the payment processing network 220 to retrieve the account information previously provisioned to the first mobile device 201A. The payment processing network 220 may use the account information from the provisioning record to generate the provisioning data (e.g., a token) for provisioning to the second mobile device 201B.

In step 411, the payment processing network 220 may generate and send a message including the provisioning data (e.g., account information, token, etc.) for provisioning the second mobile device 201B to the wallet provider computer 210.

In step 412, the wallet provider computer 210 may generate and send a provisioning response message to the second mobile device 201B including the account information for the accounts to be provisioned to the second mobile device 201B (may be referred to as "provisioning data"). In some embodiments, a secure link may be formed between the wallet provider computer 210 and the second mobile device 201B so that data can be provided to the second mobile device 201B. A secure data channel and/or encryption may be used to ensure that data is securely transmitted to the second mobile device 201B.

In step 413, the account information may be provisioned onto the secure element 102 of the second mobile device 201B. In some embodiments, provisioning the account information to the second mobile device 201B includes transmitting a set of one or more provisioning scripts to be executed by the second mobile device 201B to cause the account information to be provisioned in an activated state. In some embodiments, this transmission is made from the payment processing network 220 to the wallet provider computer 210, and the wallet provider computer 210 then forwards the set of provisioning scripts to the second mobile device 201B for execution. In some embodiments, the set of provisioning scripts includes a personalization script including account provisioning data and an activation script that, when executed, causes the provisioned account information to be provisioned in the active state. When in the active state, the provisioned account information may be used by the second mobile device 201B to perform payment transactions. In some embodiments in which the second mobile device 201B may lack a secure element, the provisioning data can be stored in a memory of the second mobile device 201B that is separate from the secure element.

Accordingly, as described above, in embodiments of the present invention, by using the interaction data (which can be absent of any account information) provided in the provisioning request, the wallet provider computer 210 and/or the payment process network 220 can retrieve the account information from the prior provisioning of the first mobile device 201A, and generate the provisioning data for the second mobile device. Thus, an account can be provisioned to the second mobile device 201B without requiring a user to enter the account information on the second mobile device 201B, and without requiring the second mobile device to send account information to the wallet provider computer 210 and/or the payment processing network 220. Although the above description has been described with reference to provisioning a mobile device, it should be understood the described techniques can also be used to provision other user devices such as other types of computing devices (e.g., a computer).

C. Additional Embodiment

In alternative embodiments, the provisioning request to provision account information to the second mobile device 201B may be sent by the first mobile device 201A to the wallet provider computer 210. In such embodiments, as the first mobile device 201A is a trusted device (e.g., due to the prior provisioning process for the first mobile device 201A), the validation code may not be required once the user 207 has provide their credentials (e.g., user name and password) for accessing the mobile wallet application 303A. In such embodiments, the first mobile device 201A may retrieve a second device identifier for the second mobile device 201B (e.g., via the location connection between the first mobile device 201A and the second mobile device 201B) and send the second device identifier as part of the interaction data to the wallet provider computer 210. The wallet provider computer 210 may then identify the second mobile device 201B using the second device identifier, and proceed using a similar process as described above to generate the second provisioning data for the second mobile device 201B.

III. Restoring Previously Provisioned Account Information to a Mobile Device

A. System

Figure 5:
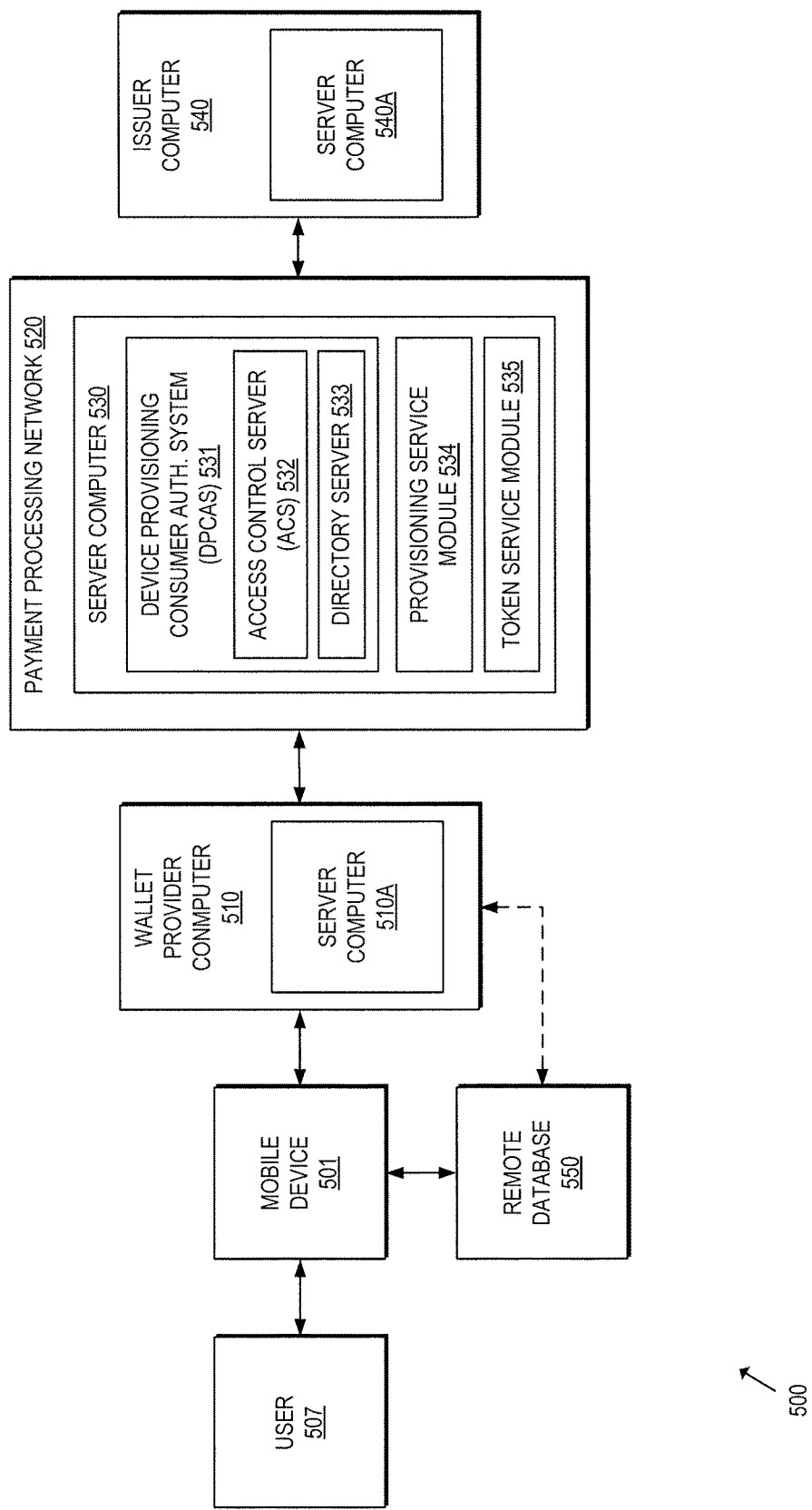
FIG. 5 depicts a block diagram of an account provisioning system according to an embodiment of the present invention.

FIG. 5 depicts a block diagram of an account provisioning system 500 according to an embodiment of the present invention. Account provisioning system 500 in FIG. 2 comprises a user 507, a mobile device 501, a wallet provider computer 510, a payment processing network 520, an issuer computer 540, and a remote database 550. Each of these systems and computers may be in operative communication with each other.

The wallet provider computer 510, the payment processing network 520, and the issuer computer 540 may be similar to the wallet provider computer 210, the payment processing network 220, and the issuer computer 240, respectively, as described above with reference to FIG. 2.

In addition to the components describe previously with respect to FIG. 2, the account provisioning system 500 depicted in FIG. 5 may include a remote database 550. The remote database may be a computer for storage of provisioned data. For example, the remote database may store a backup copy of account information previously provisioned to the mobile device 501. The backup account information may be associated to a specific user 507 or the specific mobile device 501, and may be accessed using a passcode issued to the user 507.

In some embodiments, the remote database 550 may be associated with the wallet provider computer 510, the payment processing network 520, or a third party computer. In some embodiments, the remote database 550 may be accessed directly by the user 507 via the mobile device 501. In other embodiments, the remote database 550 may be accessed by the wallet provider computer 510, the payment processing network 520, or the third party computer, in response to a request by the user 507 sent via the mobile device 501.

B. Methods

Figure 6:
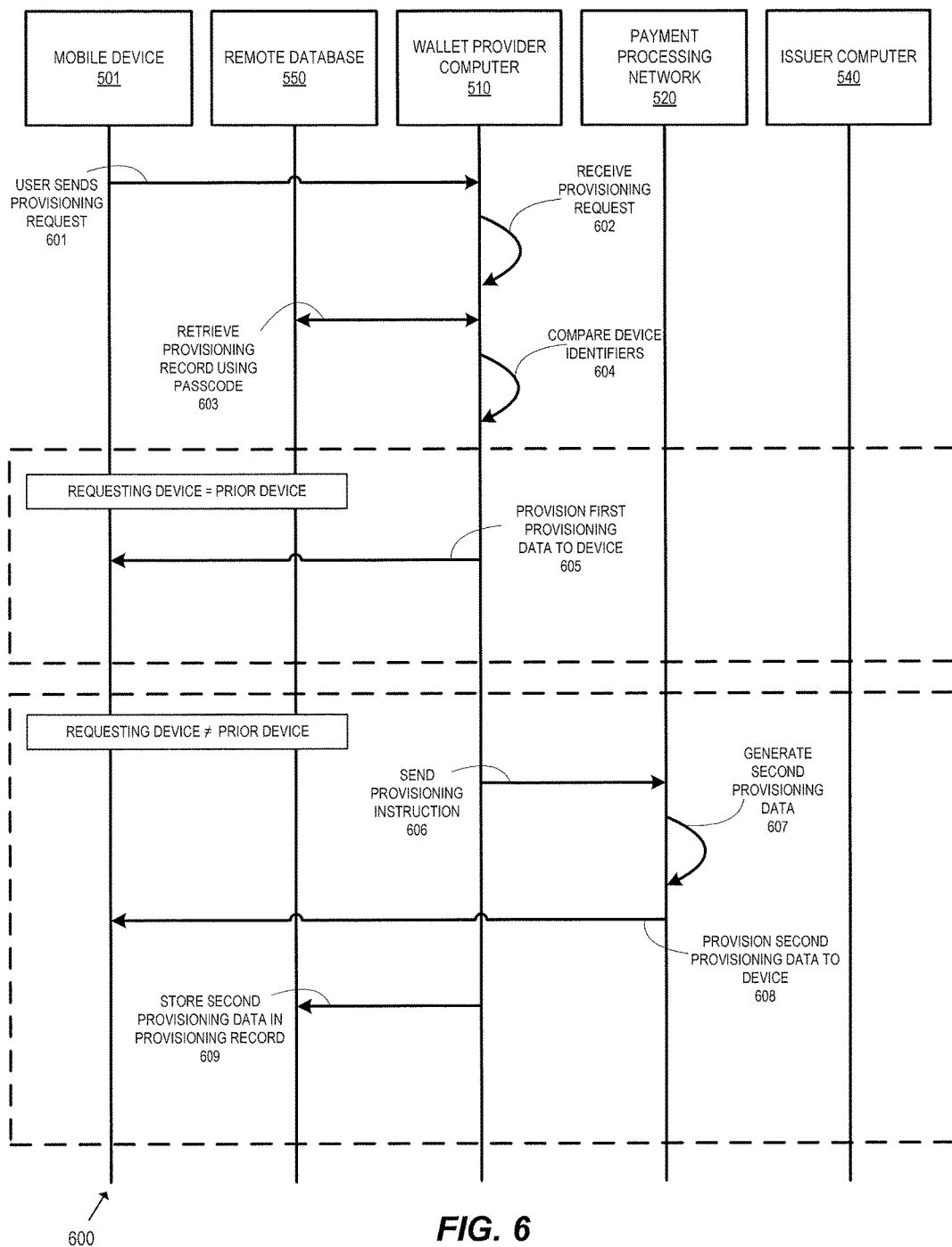
FIG. 6 depicts a flow diagram depicting restoring provisioned accounts to a mobile device in an account provisioning system according to an embodiment of the present invention.

Methods according to embodiments of the invention can be described with respect to FIGS. 3 and 5-6.

FIG. 6 depicts a flow diagram depicting account provisioning in an account provisioning system according to an embodiment of the present invention.

In step 601, the user 507 may send a provisioning request to the wallet provider computer 510 to provision account information for an account to a requesting mobile device 501. In some embodiments, the provisioning request may include a passcode and a device identifier associated with the requesting mobile device 501.

In some embodiments, the passcode may have been generated in response to a prior provisioning request initiated by a prior mobile device that results in the provisioning of first provisioning data to the prior mobile device. In such embodiments, the prior mobile device may have performed a provisioning process and subsequently performed a provisioning backup process to back up the first provisioning data to a remote database 550. In such embodiments, in the provisioning backup process, a provisioning record may have been generated by the wallet provider computer 510. The provisioning record may store the first provisioning data including a first token associated with account information, a device identifier associated with the prior mobile device, and the passcode used to verify the identity of user's making future requests for data stored in the remote database 550.

In other embodiments, the passcode may be a unique set of characters selected by the user 507 during the provisioning backup process.

In step 602, the wallet provider computer 510 may receive the provisioning request from the requesting mobile device 501. The wallet provider computer 510 may analyze the provisioning request from the requesting mobile device 501 to retrieve the passcode and the device identifier for the requesting mobile device 501. In some embodiments, the passcode may be used to authenticate the user 507 making the provisioning request as being the user 507 that initiated the provisioning backup process. In some embodiments, the passcode may be used to identify the provisioning record associated with the user from the remote database 550.

In step 603, the wallet provider computer 510 may retrieve the provisioning record associated with the account from the remote database 550 using the passcode. In some embodiments, the provisioning record may include a device identifier associated with the prior mobile device that was previously provisioned with first provisioning data associated with the account. The provisioning record may also include the first provisioning data for one or more accounts that were provisioned to the prior mobile device.

In step 604, the wallet provider computer 510 may compare the device identifier associated with the requesting mobile device 501 to the device identifier associated with the prior mobile device to determine if the requesting mobile device 501 is the same mobile device as the prior device. The device identifier may refer to data regarding the mobile device, including an IP address, a MAC address, browser data, operating system data, device type (e.g., data indicating that the device is a phone or card, or is made by a particular manufacturer), SIM card number, mobile application data, secure element identifier, and any other data that may be used to uniquely identify the mobile device.

In step 605, when the wallet provider computer 510 determines that the requesting mobile device 501 is the same mobile device as the prior device, the wallet provider computer 510 may initiate provisioning of the first provisioning data to the requesting mobile device 501. In some embodiments, the first provisioning data may include a first token associated with the account. In such embodiments, as the prior mobile device is the same mobile device as the requesting mobile device 501, the first provisioning data, including the first token, may be re-provisioned to the requesting mobile device 501 without requiring generating new provisioning data or new tokens. The first provisioning data may be retrieved from the provisioning record, and may be the same provisioned account information provided to the prior mobile device, and stored in the provisioning record as part of the provisioning backup process, as described in step 601 above.

In step 606, when the wallet provider computer 510 determines that the requesting mobile device 501 is not the same mobile device as the prior device, the wallet provider computer 510 may initiate provisioning of second provisioning data to the requesting mobile device 501. In some embodiments, the wallet provider computer 510 may send a provisioning instruction message to a payment processing network 520. In such embodiments, as the prior mobile device is not the same mobile device as the requesting mobile device 501, the first provisioning data, including the first token, may not be re-provisioned to the requesting mobile device 501. In such situations, new provisioning data, including a second token that is different from the first token, may be generated in order to provision the account to the requesting mobile device 501.

In step 607, the payment processing network 520 may generate the second provisioning data. In some embodiments, the wallet provider computer 510 may send a provision instruction to a second server computer (e.g., the payment processing network 520) to generate the second provision data. In some embodiments, the provisioning service module 534 associated with the payment processing network server computer 530 may contain code for generating the second provisioning data for the account. In some embodiments, the token service module 535 associated with the payment processing network server computer 530 may contain code for generating tokens representing the account information for the account. In some embodiments, as described above with respect to steps 407-409 of FIG. 4, the provisioning request may be sent to an issuer computer 540 associated with the account to be provisioned for verification and approval of the provisioning request. In some embodiments, the second provisioning data may include a second token associated with the account where the second token is different from the first token.

In other embodiments, the wallet provider computer 510 may be configured to generate the second provisioning data, including one or more tokens, on behalf of the payment processing network 520.

In step 608, the second provisioning data may be provisioned to the requesting mobile device 501. In some embodiments, the second provisioning data may be sent by the payment processing network 520 to the wallet provider computer 510 for provisioning to the requesting mobile device 501. In some embodiments, the second provisioning data may be provisioned to a secure element 502 of the requesting mobile device 501. The second provisioning data may include the account information for the account associated with the user 507.

In some embodiments, provisioning the account information to the requesting mobile device 501 may include transmitting a set of one or more provisioning scripts to be executed by the requesting mobile device 501 to cause the account information to be provisioned in an activated state. In some embodiments, this transmission is made from the payment processing network 520 to the wallet provider computer 510, and the wallet provider computer 510 then forwards the set of provisioning scripts to the requesting mobile device 501 for execution. In some embodiments, the set of provisioning scripts includes a personalization script including account provisioning data and an activation script that, when executed, causes the provisioned account information to be provisioned in the active state. When in the active state, the provisioned account information may be used by the requesting mobile device 501 for payment transactions.

In step 609, the second provisioning data may be store to the provisioning record in the remote database 550. In some embodiments, the second provisioning data may be automatically stored in a new provisioning record associated with the requesting mobile device 501. In other embodiments, the user 507 may initiate the storage of the second provisioning data in the remote database and receive a new passcode associated with the second provisioning data.

Although the above description has been described with reference to provisioning a mobile device, it should be understood that the described techniques can also be used to provision other user devices, such as other types of computing devices (e.g., a computer).

IV. Technical Benefits

Embodiments of the present invention provide a number of technical advantages. For example, by using data related to a prior provisioning process for a first mobile device to provision a second mobile device, embodiments of the present invention provide for the efficient use of computing resources. In some embodiments, the performance of the prior provisioning process allows the second mobile device to be provisioned without requiring a new request be sent to an issuer computer to verify the account eligibility for provisioning and for issuer approval of the provisioning. This has the technical benefit of reducing the amount of messages that need to be passed between computers to perform the provisioning process.

In addition, the provisioning process to the second mobile device using the prior provisioning process allows for accounts to be provisioned to the second mobile device without requiring the second mobile device to send account information to the wallet provider computer and/or the payment processing network. For example, in prior solutions, provisioning requests would require the user to send additional data, including an account identifier such as a PAN associated with each account to be provisioned to the mobile device, an expiration date for each account, and/or user information associated with each account. In embodiments of the present invention, by using the prior provisioning process, the provisioning process for additional mobile devices may only require a device identifier of the prior device and/or a passcode or validation code. Thus, embodiments of the present invention provide for provisioning accounts to the second mobile device to be faster, easier, and with less data being sent, thus conversing system resources.

V. Exemplary Apparatuses

The various participants and elements, such as, e.g., the mobile gateway, described herein with reference to the figures may operate one or more computer apparatuses to facilitate the functions described herein. Any of the elements in the figures, including any servers or databases, may use any suitable number of subsystems to facilitate the functions described herein.

Figure 7:
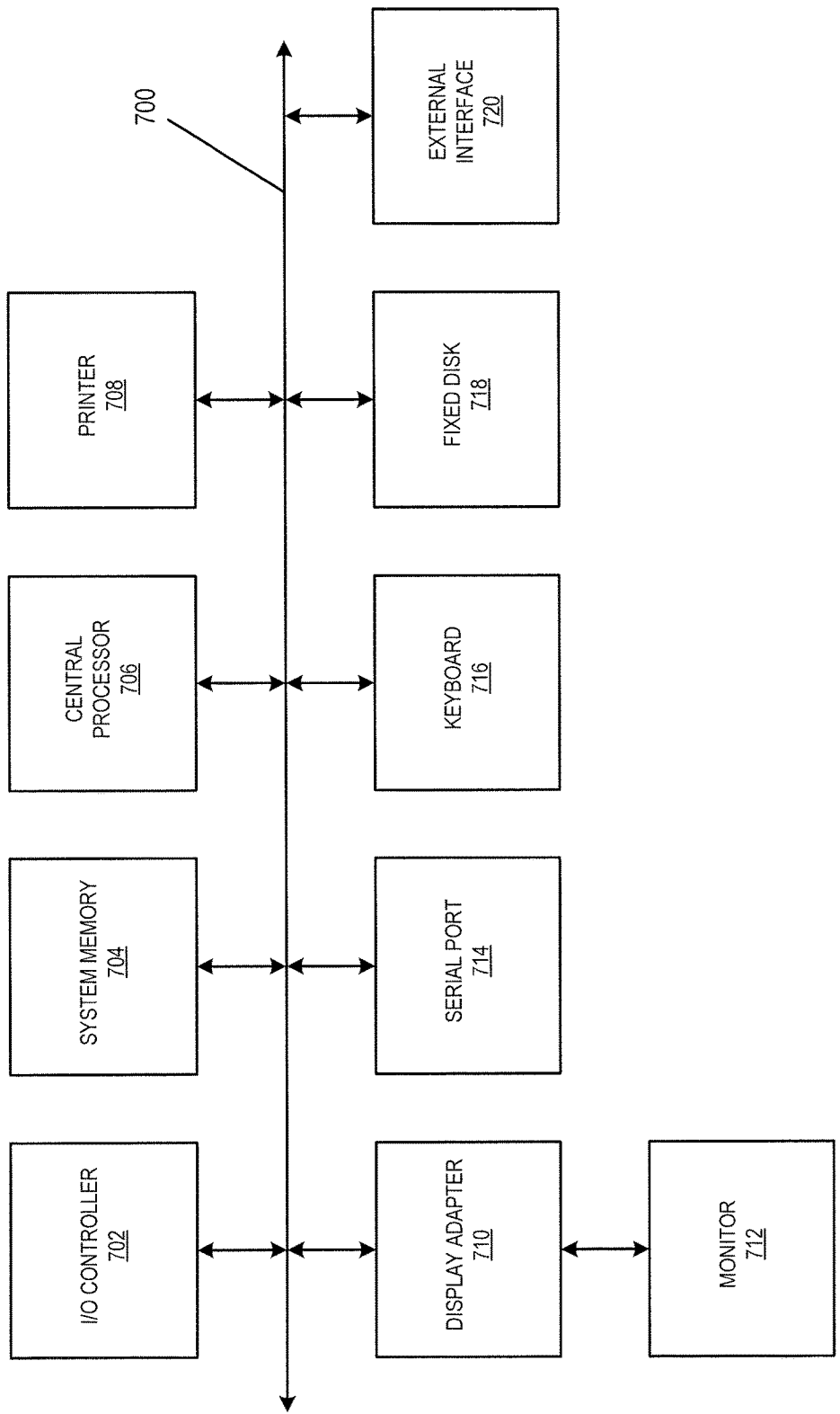
FIG. 7 shows a block diagram of a computer apparatus according to an embodiment of the invention.

Examples of such subsystems or components are shown in FIG. 7. The subsystems shown in FIG. 7 are interconnected via a system bus 700. Additional subsystems such as a printer 708, keyboard 714, fixed disk 716 (or other memory comprising computer readable media), monitor 720, which is coupled to display adapter 710, and others are shown. Peripherals and input/output (I/O) devices, which couple to I/O controller 702 (which can be a processor or other suitable controller), can be connected to the computer system by any number of means known in the art, such as serial port 712. For example, serial port 712 or external interface 718 can be used to connect the computer apparatus to a wide area network such as the Internet, a mouse input device, or a scanner. The interconnection via system bus allows the central processor 706 to communicate with each subsystem and to control the execution of instructions from system memory 704 or the fixed disk 716, as well as the exchange of information between subsystems. The system memory 704 and/or the fixed disk 716 may embody a computer readable medium.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for provisioning payment account information that was previously provisioned and stored on a first device, to a second device, the method comprising:
   receiving, by a server computer from the second device, a message to initiate a provisioning process, after the second device interacts with the first device storing the payment account information through a local connection, and receives a first device identifier from the first device;
   after receiving the message, generating, by the server computer, a validation code;
   sending, by the server computer, the validation code to the first device, wherein the validation code is subsequently received by the second device from the first device through the local connection;
   receiving, by the server computer, a provisioning request from the second device, wherein the provisioning request comprises interaction data comprising the validation code and a network identifier indicating a type of local connection that forms the local connection between the first device and the second device;
   determining, by the server computer, that provisioning the second device with the payment account information is permitted based upon the interaction data comprising the validation code and the network identifier indicating the type of local connection that forms the local connection between the first device and the second device; and
   initiating, by the server computer, provisioning of the second device with the payment account information associated with the first device, and causing the payment account information to be stored in the second device.

2. The method of claim 1, further comprising:
   determining, by the server computer, the payment account information provisioned on the first device using the validation code received from the second device.

3. The method of claim 1, wherein the server computer is a first server computer, and wherein initiating the provisioning comprises sending a provisioning instruction message to a second server computer.

4. The method of claim 1, wherein determining that provisioning the second device with the payment account information is permitted comprises:
   determining that the validation code generated by the server computer matches the validation code in the provisioning request received from the second device.

5. The method of claim 1, wherein the provisioning request includes the first device identifier associated with the first device and a second device identifier associated with the second device.

6. The method of claim 5, wherein the first device identifier is a secure element identifier of the first device.

7. The method of claim 1, wherein determining that provisioning the second device with the payment account information is permitted comprises:
verifying, by the server computer, that the first device is co-located with the second device.

8. The method of claim 1, wherein initiating, by the server computer, provisioning of the second device with the payment account information associated with the first device comprises transmitting a request to provision to an issuer computer via a payment processing network.

9. The method of claim 1, wherein the local connection uses a wireless communication technology complying with Institute of Electrical and Electronics Engineers (IEEE) standard 802.15.1 and the network identifier indicates a wireless connection complying with the IEEE standard 802.15.1.

10. A computer comprising:
a processor; and
a tangible non-transitory computer readable medium coupled to the processor, the tangible non-transitory computer readable medium comprising code, executable by the processor for implementing the method of claim 1.

11. The computer of claim 10, wherein the computer is a wallet provider computer.

12. A method for provisioning payment account information for an account that was previously provisioned and stored on a first device, to a second device, the method comprising:
sending, to a server computer from the second device, a message to initiate a provisioning process, after the second device interacts with the first device storing the payment account information through a local connection, and includes a first device identifier for the first device, wherein the server computer thereafter generates a validation code, and sends the validation code to the first device, wherein the validation code is subsequently received by the second device from the first device through the local connection;
sending, by the second device, a provisioning request to the server computer, the provisioning request including interaction data comprising the validation code and a network identifier indicating a type of local connection that forms the local connection between the first device and the second device, wherein the server computer determines that provisioning the second device with the payment account information is permitted based upon the interaction data comprising the validation code and the network identifier;
receiving, by the second device, provisioning data comprising the payment account information from the server computer; and
storing, by the second device, the payment account information.

13. The method of claim 12, wherein the provisioning request includes the first device identifier associated with the first device and a second device identifier associated with the second device.

14. The method of claim 13, wherein the second device identifier is a secure element identifier of the second device.

15. A computing device comprising:
a processor; and
a tangible non-transitory computer readable medium coupled to the processor, the tangible non-transitory computer readable medium comprising code, executable by the processor for implementing the method of claim 12.

16. The computing device of claim 15, wherein the computing device is the second device, and wherein the second device is a mobile phone.

17. A method comprising:
receiving, by a server computer, a provisioning request from a requesting device to provision data relating to a payment account onto the requesting device, the provisioning request including a passcode and a device identifier associated with the requesting device, wherein the passcode identifies a provisioning record associated with data relating to the payment account from a database;
retrieving, by the server computer, the provisioning record associated with the data relating to the payment account from the database using the passcode, wherein the provisioning record includes a device identifier associated with a prior device that was previously provisioned with first provisioning data associated with the payment account;
comparing, by the server computer, the device identifier associated with the requesting device to the device identifier associated with the prior device to determine if the requesting device is the prior device;
when the requesting device is determined to be the prior device:
initiating, by the server computer, provisioning of first provisioning data to the requesting device, and causing the first provisioning data to be stored in the requesting device; and
when the requesting device is determined to be a different device than the prior device:
initiating, by the server computer, provisioning of second provisioning data comprising payment account information to the requesting device, and causing the payment account information to be stored in the requesting device.

18. The method of claim 17, wherein the first provisioning data includes a first token associated with the payment account.

19. The method of claim 18, where the second provisioning data includes a second token associated with the payment account, the second token being a different token than the first token.

20. The method of claim 17, wherein the server computer is a first server computer, and wherein initiating the provisioning of the second provisioning data comprising the payment account information to the requesting device comprises sending a provisioning instruction message to a second server computer.

21. A computer comprising:
a processor; and
a tangible non-transitory computer readable medium coupled to the processor, the tangible non-transitory computer readable medium comprising code, executable by the processor for implementing the method of claim 17.

* * * * *